(12) United States Patent
Vido et al.

(10) Patent No.: US 11,629,498 B2
(45) Date of Patent: Apr. 18, 2023

(54) REINFORCED BREATHABLE SHEET

(71) Applicant: Owens Corning Intellectual Capital, LLC, Toledo, OH (US)

(72) Inventors: Martin Vido, Surrey (CA); Ronald Boisvert, Pickerington, OH (US); Steve Thaxton, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 17/052,230

(22) PCT Filed: May 10, 2019

(86) PCT No.: PCT/US2019/031642
§ 371 (c)(1),
(2) Date: Nov. 2, 2020

(87) PCT Pub. No.: WO2019/217769
PCT Pub. Date: Nov. 14, 2019

(65) Prior Publication Data
US 2021/0079657 A1    Mar. 18, 2021

Related U.S. Application Data

(60) Provisional application No. 62/670,359, filed on May 11, 2018.

(51) Int. Cl.
*E04D 12/00* (2006.01)
*B32B 5/02* (2006.01)
(Continued)

(52) U.S. Cl.
CPC ............ *E04D 12/002* (2013.01); *B32B 5/022* (2013.01); *B32B 5/024* (2013.01); *B32B 27/36* (2013.01);
(Continued)

(58) Field of Classification Search
CPC ......... B32B 5/022; B32B 5/024; B32B 27/36; B32B 2255/26; B32B 2262/0276;
(Continued)

(56) References Cited

U.S. PATENT DOCUMENTS 3,888,684 A    6/1975  Little
4,351,873 A    9/1982  Davis
(Continued)

FOREIGN PATENT DOCUMENTS

CA    1335532 C       5/1995
CN    103585894 A     2/2014
(Continued)

OTHER PUBLICATIONS

Midha et al., Spun bonding technology and fabric properties: a review, Journal of Textile Engineering & Fashion Technology (Year: 2017).*
(Continued)

*Primary Examiner* — Nathan L Van Sell
(74) *Attorney, Agent, or Firm* — Calfee, Halter & Griswold LLP (57) ABSTRACT

A non-asphaltic breathable sheet is provided that includes at least one breathable polymer layer and at least one nonwoven layer. The breathable sheet may include an open-mesh reinforcing fabric embedded in a breathable polymer layer. The breathable sheet has an advantageous balance of strength, water resistance, and permeability to water vapor.

15 Claims, 7 Drawing Sheets

(51) Int. Cl.
  *B32B 27/36* (2006.01)
  *D06N 5/00* (2006.01)
  *E04B 1/62* (2006.01)

(52) U.S. Cl.
  CPC ... *B32B 2255/26* (2013.01); *B32B 2262/0276* (2013.01); *B32B 2262/101* (2013.01); *B32B 2307/718* (2013.01); *B32B 2419/06* (2013.01); *D06N 5/00* (2013.01); *D06N 2209/123* (2013.01); *E04B 1/625* (2013.01)

(58) Field of Classification Search
  CPC ........ B32B 2262/101; B32B 2307/718; B32B 2419/06; B32B 27/308; B32B 27/12; B32B 2307/724; B32B 2262/0253; B32B 2262/0238; B32B 2262/0246; B32B 2262/0261; B32B 2262/023; B32B 2250/42; B32B 2262/0284; B32B 27/40; B32B 27/32; B32B 5/028; E04D 12/002; D06N 5/00; D06N 2209/123; E04B 1/625
  See application file for complete search history.

(56) References Cited

U.S. PATENT DOCUMENTS

| | | | |
|---|---|---|---|
| 5,291,712 A | 3/1994 | Curran |
| 5,579,619 A | 12/1996 | Godschalx |
| 5,687,517 A | 11/1997 | Wiercinski et al. |
| 5,704,834 A | 1/1998 | Sells |
| 5,854,149 A | 12/1998 | Nagayama et al. |
| 6,355,333 B1 | 3/2002 | Waggoner et al. |
| 6,524,847 B2 | 2/2003 | Bisbis |
| 6,569,225 B2 | 5/2003 | Edmundson et al. |
| 6,682,803 B2 | 1/2004 | McCormack et al. |
| 6,821,661 B2 | 11/2004 | Haridoss et al. |
| 7,148,160 B2 | 12/2006 | Porter |
| 7,202,322 B2 | 4/2007 | Vedula et al. |
| 7,285,324 B1 | 10/2007 | Albertone et al. |
| 7,307,031 B2 | 12/2007 | Carroll et al. |
| 7,381,666 B2 | 6/2008 | Little et al. |
| 7,393,799 B2 | 7/2008 | Porter |
| 7,442,659 B2 | 10/2008 | Moll |
| 7,490,893 B2 | 2/2009 | Asbury et al. |
| 7,520,097 B2 | 4/2009 | Aalbers et al. |
| 7,735,279 B2 | 6/2010 | Paradis et al. |
| 7,757,447 B2 | 7/2010 | Aalbers et al. |
| 7,838,123 B2 | 11/2010 | Chen et al. |
| 7,887,900 B2 | 2/2011 | DiPede |
| 7,914,634 B2 | 3/2011 | Moll |
| 8,007,616 B2 | 8/2011 | Jones et al. |
| 8,029,892 B2 | 10/2011 | Lacroix |
| 8,079,184 B2 | 12/2011 | Wiercinski et al. |
| 8,216,660 B2 | 7/2012 | Nahmias et al. |
| 8,263,184 B2 | 9/2012 | Klingelhage et al. |
| 8,287,984 B2 | 10/2012 | Grail |
| 8,309,211 B2 | 11/2012 | Mehta et al. |
| 8,323,770 B2 | 12/2012 | Mehta et al. |
| 8,420,176 B2 | 4/2013 | Chen et al. |
| 8,431,209 B2 | 4/2013 | Bletsos et al. |
| 8,497,010 B2 | 7/2013 | Bletsos et al. |
| 8,511,030 B2 | 8/2013 | Wilson et al. |
| 8,562,769 B2 | 10/2013 | Kraus et al. |
| 8,598,052 B2 | 12/2013 | Suzuki et al. |
| 8,637,139 B2 | 1/2014 | Todt et al. |
| 8,707,646 B2 | 4/2014 | Keane |
| 8,728,605 B2 | 5/2014 | Payne et al. |
| 8,828,487 B2 | 9/2014 | Todt et al. |
| 8,852,749 B2 | 10/2014 | Chen |
| 8,883,284 B2 | 11/2014 | Todt et al. |
| 9,174,420 B2 | 11/2015 | Chen et al. |
| 9,314,994 B2 | 4/2016 | Strait |
| 9,452,595 B2 | 9/2016 | Cartier et al. |
| 9,540,820 B2 | 1/2017 | Kalkanoglu et al. |
| 9,624,663 B2 | 4/2017 | Wingfield |
| 9,827,755 B2 | 11/2017 | Afshari |
| 9,909,301 B2 | 3/2018 | Milne et al. |
| 9,920,516 B2 | 3/2018 | Alter et al. |
| 9,926,702 B2 | 3/2018 | Rockwell et al. |
| 10,369,769 B2 | 8/2019 | Afshari |
| 10,435,525 B2 | 10/2019 | Schmitzer et al. |
| 10,435,550 B2 | 10/2019 | Chou et al. |
| 10,569,517 B2 | 2/2020 | Chou |
| 2002/0132547 A1 | 9/2002 | Grondin et al. |
| 2003/0091812 A1 | 5/2003 | Zubry |
| 2004/0023588 A1 | 2/2004 | Klein |
| 2005/0014431 A1 | 1/2005 | Carmody et al. |
| 2005/0097857 A1 | 5/2005 | Mehta et al. |
| 2005/0227086 A1 | 10/2005 | Murphy |
| 2005/0260904 A1 | 11/2005 | Shepherd et al. |
| 2006/0078753 A1 | 4/2006 | Bomberg et al. |
| 2006/0281379 A1 | 12/2006 | Haas et al. |
| 2006/0286347 A1 | 12/2006 | Mehta et al. |
| 2007/0044397 A1 | 3/2007 | Wiercinski et al. |
| 2007/0249252 A1 | 10/2007 | Galvin |
| 2008/0187740 A1* | 8/2008 | Bletsos ............... B32B 5/024 428/306.6 |
| 2008/0274328 A1 | 11/2008 | Gkinosatis |
| 2009/0049765 A1 | 2/2009 | Grant |
| 2009/0176117 A1 | 7/2009 | Gkinosatis |
| 2010/0056004 A1 | 3/2010 | Galvin et al. |
| 2010/0062231 A1 | 3/2010 | Abed et al. |
| 2010/0154338 A1 | 6/2010 | Riccelli et al. |
| 2010/0178827 A1 | 7/2010 | Thai et al. |
| 2010/0273379 A1 | 10/2010 | Chen et al. |
| 2011/0014432 A1 | 1/2011 | Terada |
| 2011/0130062 A1 | 6/2011 | Squires |
| 2011/0300273 A1 | 12/2011 | Chen |
| 2012/0096791 A1 | 4/2012 | Cashin et al. |
| 2012/0203191 A1 | 8/2012 | Maruo et al. |
| 2012/0329354 A1 | 12/2012 | Afshari |
| 2013/0029550 A1 | 1/2013 | Seth et al. |
| 2013/0122769 A1 | 5/2013 | Brabbs et al. |
| 2013/0167461 A1 | 7/2013 | Brabbs et al. |
| 2015/0024159 A1 | 1/2015 | Bess et al. |
| 2015/0140303 A1 | 5/2015 | Martin Gracia et al. |
| 2015/0175792 A1 | 6/2015 | Chou et al. |
| 2016/0039186 A1 | 2/2016 | Sarda |
| 2016/0263859 A1 | 9/2016 | Rao et al. |
| 2016/0303837 A1 | 10/2016 | Chou |
| 2017/0036429 A1 | 2/2017 | Hartmann et al. |
| 2017/0129228 A1 | 5/2017 | Middlesworth et al. |
| 2017/0152377 A1 | 6/2017 | Wang et al. |
| 2017/0326835 A1 | 11/2017 | Xiang Li |
| 2017/0361582 A1 | 12/2017 | Planeta et al. |
| 2017/0368782 A1 | 12/2017 | Abisror et al. |
| 2018/0043674 A1 | 2/2018 | Afshari |
| 2018/0195271 A1 | 7/2018 | Milne et al. |
| 2018/0371759 A1 | 12/2018 | Harco |
| 2019/0054721 A1 | 2/2019 | Planeta et al. |
| 2019/0119847 A1 | 4/2019 | Brabbs et al. |
| 2019/0292358 A1 | 9/2019 | Perez et al. |
| 2019/0308397 A1 | 10/2019 | Afshari |
| 2019/0344543 A1 | 11/2019 | Seth |

FOREIGN PATENT DOCUMENTS

| | | |
|---|---|---|
| DE | 9407750 U1 | 6/1994 |
| EP | 167714 A2 | 1/1986 |
| EP | 288257 A2 | 10/1988 |
| EP | 716176 A2 | 6/1996 |
| EP | 855479 A2 | 7/1998 |
| EP | 708212 B1 | 5/2000 |
| EP | 880628 B1 | 5/2002 |
| EP | 784725 B1 | 6/2003 |
| EP | 1400348 A2 | 3/2004 |
| EP | 1294656 B1 | 9/2004 |
| EP | 1489246 A1 | 12/2004 |
| EP | 1650022 B1 | 11/2008 |
| EP | 2010377 B1 | 1/2011 |
| EP | 2288769 B1 | 2/2014 |
| EP | 1789622 B1 | 12/2014 |
| EP | 2868468 A1 | 5/2015 |
| EP | 1756379 B1 | 3/2016 |

(56) References Cited

FOREIGN PATENT DOCUMENTS

| | | | |
|---|---|---|---|
| EP | 1558661 B2 | 9/2016 | |
| EP | 3345757 A1 | 7/2018 | |
| GB | 2502286 A | 11/2013 | |
| RU | 2418820 C2 * | 5/2011 | ............ B32B 27/08 |
| WO | 9858140 A1 | 12/1998 | |
| WO | 2006080907 A1 | 8/2006 | |
| WO | 2006084355 A1 | 8/2006 | |
| WO | 2013071184 A1 | 5/2013 | |
| WO | 2015027282 A1 | 3/2015 | |
| WO | 2017079209 A1 | 5/2017 | |
| WO | 2017139884 A1 | 8/2017 | |
| WO | 2018094199 A1 | 5/2018 | |
| WO | 2019217769 A1 | 11/2019 | |

OTHER PUBLICATIONS

International Search Report and Written Opinion from PCT/US19/31642 dated Jul. 12, 2019.
Bosack et al., "Durability of Wall Systems Containing Housewrap," Durability of Building Materials and Components 8. (1999) Edited by M.A. Lacasse and D.J. Vanier. Institute for Research in Construction, Ottawa ON, K1A 0R6, Canada, pp. 959-969.
Office Action from IN Application No. 202037050011 dated May 18, 2022.
Office Action from TW Application No. 108116249 dated Aug. 9, 2022.
Office Action from CN Application No. 201980036971.2 dated Jul. 5, 2022.

* cited by examiner

REINFORCED BREATHABLE SHEET

CROSS-REFERENCE TO RELATED APPLICATIONS

This application is the U.S. national stage entry of PCT/US2019/031642, filed May 10, 2019, which claims priority to and any benefit of U.S. Provisional Application No. 62/670,359, filed May 11, 2018, the contents of each of which are incorporated herein by reference in their entireties.

FIELD

The general inventive concepts relate to a composite building material, and more particularly, a non-asphaltic reinforced breathable sheet.

BACKGROUND

In the roofing industry, a roofing underlayment is typically applied to the deck of a roof prior to the application of shingles or other roofing material. The roofing industry has developed non-bituminous, (i.e., non-asphaltic), underlayments. Conventional non-bituminous underlayments include TITANIUM UDL and RHINOROOF (sold by Owens Corning of Toledo, Ohio). Non-asphaltic underlayments tend to be water-resistant but substantially non-breathable. That is, the non-asphaltic underlayments do not for the passage of allow air or water vapor. As a result, moisture from the interior of the building is unable to escape to the exterior.

Building wraps are weather-resistant barriers that prevent rain or other sources of water from getting into the wall assembly of a building while allowing water vapor to pass to the exterior. Building wraps, also called house wraps, are installed by attaching the wrap to structural supports, such as studs, over the sheathing of the building and behind the exterior siding. Presently, conventional building wraps are typically lacking in either strength or breathability.

Accordingly, there is a need in the art for breathable building materials with good strength characteristics.

SUMMARY

It is proposed herein to provide a non-asphaltic reinforced breathable sheet.

In some exemplary embodiments, a breathable sheet is provided. The breathable sheet comprising a first breathable polymer layer; a first nonwoven layer applied to the first breathable polymer layer; a second breathable polymer layer applied to the first nonwoven layer; and a second nonwoven layer applied to the second breathable polymer layer.

In some exemplary embodiments, a third breathable polymer layer applied to the second nonwoven layer.

In some exemplary embodiments, further comprising an open-mesh reinforcing fabric embedded in the second breathable polymer layer. In some exemplary embodiments, the open-mesh reinforcing fabric is a polymeric leno-woven fabric. In some exemplary embodiments, the open-mesh reinforcing fabric is a cross-laid glass scrim. In some exemplary embodiments, the first nonwoven layer and the second nonwoven layer are both polymeric nonwoven layers. In some exemplary embodiments, the polymeric nonwoven layers are point bonded. In some exemplary embodiments, the polymeric nonwoven layers are selected from the group consisting of melt-blown nonwovens, spunbond nonwovens, flashspun nonwovens, and combinations thereof.

In some exemplary embodiments, each breathable polymer layer is a microporous polymer layer.

In some exemplary embodiments, each breathable polymer layer comprises a breathable polymer composition that includes an inherently breathable polymer. In some exemplary embodiments, the inherently breathable polymer is selected from olefin-acrylate copolymers, thermoplastic polyurethanes, thermoplastic copolyesters, and combinations thereof.

In some exemplary embodiments, the breathable polymer composition includes ethylene methacrylate copolymer and ethylene acrylate maleic anhydride. In some exemplary embodiments, the breathable polymer composition includes ethylene methacrylate copolymer, ethylene acrylate maleic anhydride, and polyether block amide. In some exemplary embodiments, the breathable polymer composition includes a thermoplastic copolyester, ethylene acrylate maleic anhydride, and polyether block amide.

In some exemplary embodiments, the general inventive concepts relate to and contemplate a roofing system comprising: a roofing deck; the breathable sheet as described above disposed on the roofing deck; and a roofing material disposed on the breathable sheet.

In some exemplary embodiments, the general inventive concepts relate to and contemplate a breathable sheet comprising: a first breathable polymer layer; a first nonwoven layer applied to the first breathable polymer layer; a second breathable polymer layer applied to the first nonwoven layer, wherein an open-mesh reinforcing fabric is embedded in the second breathable polymer layer; a second nonwoven layer applied to the second breathable polymer layer; and a third breathable polymer layer applied to the second nonwoven layer.

In some exemplary embodiments, a wall system is provided. The wall system comprising: structural supports; an exterior wall covering material; and the breathable sheet as described above, wherein the breathable sheet is situated between the structural supports and the exterior wall covering material, and the breathable sheet is attached to the structural supports.

In some exemplary embodiments, the wall system further comprises sheathing panels attached to the structural supports.

In some exemplary embodiments, a roofing system is provided. The roofing system comprising a metal support structure; breathable sheet disposed on the metal support structure, the breathable sheet comprising: a first breathable polymer layer, and a first nonwoven layer; a layer of insulation disposed on the breathable sheet; and a standing seam roofing panel situated above the layer of insulation.

In some exemplary embodiments, the first nonwoven layer and the second nonwoven layer are both polymeric nonwoven layers. In some exemplary embodiments, the polymeric nonwoven layers are point bonded. In some exemplary embodiments, the polymeric nonwoven layers are selected from the group consisting of melt-blown nonwovens, spunbond nonwovens, flashspun nonwovens, and combinations thereof.

In some exemplary embodiments, the breathable sheet consists of the nonwoven layer and the first breathable polymer layer.

In some exemplary embodiments, each breathable polymer layer is a microporous polymer layer.

In some exemplary embodiments, each breathable polymer layer comprises a breathable polymer composition that includes an inherently breathable polymer.

In some exemplary embodiments, the inherently breathable polymer is selected from olefin-acrylate copolymers, thermoplastic polyurethanes, thermoplastic copolyesters, and combinations thereof.

In some exemplary embodiments, the breathable polymer composition includes ethylene methacrylate copolymer and ethylene acrylate maleic anhydride.

In some exemplary embodiments, the breathable polymer composition includes ethylene methacrylate copolymer, ethylene acrylate maleic anhydride, and polyether block amide.

In some exemplary embodiments, the breathable polymer composition includes a thermoplastic copolyester, ethylene acrylate maleic anhydride, and polyether block amide.

Numerous other aspects, advantages, and/or features of the general inventive concepts will become more readily apparent from the following detailed description of exemplary embodiments, from the claims, and from the accompanying drawings being submitted herewith.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts encompass various embodiments that are directed, at least in part, to a non-asphaltic breathable sheet. In one or more embodiments, the breathable sheet includes at least one breathable polymer layer and at least one nonwoven layer. The breathable sheet may also include an open-mesh reinforcing fabric embedded in a breathable polymer layer. The breathable sheet does not include asphalt in the composition of the breathable polymer layer, nonwoven layer, or the open-mesh reinforcing fabric.

The terms "breathability" or "breathable" refer to materials that are permeable to water vapor or moisture vapor having a moisture vapor transmission rate (MTVR) of, at a minimum, 1 perm [i.e., about 57.2 nanograms per pascal per second per square meter (ng/(Pa·s·m2))] or greater. The MTVR is measured using a standard ASTM measurement, i.e., ASTM E96-80 Proc. A. As those skilled in the art will appreciate, a higher perm value corresponds to a higher vapor permeance.

The breathable sheet has an advantageous balance of strength, water resistance, and permeability to water vapor. The breathable sheet may be used as a construction material such as, for example, a roofing underlayment, a building wrap, and a vapor control layer. When used as a construction material, the water-resistant properties of the breathable sheet help to keep water out of the interior of the building structure. Additionally, the breathable sheet is permeable to water vapor so that water within the interior of the build can evaporate and traverse the breathable sheet to the exterior of the building. The water-resistant properties and breathability of the breathable sheet are provided through the use of the breathable polymer layer. The nonwoven layer and any open-mesh reinforcing fabric included in the breathable sheet generally have pores or openings to the extent that, on their own, they would not have water resistant properties.

Figure 1:
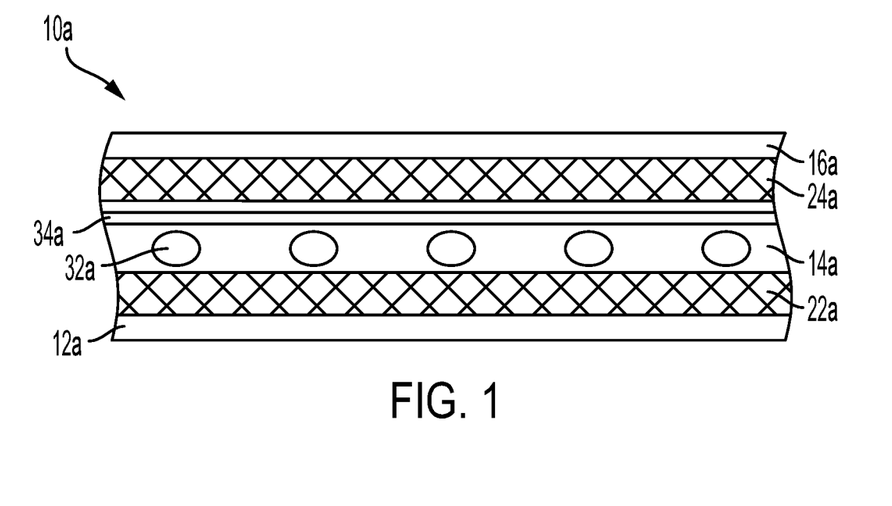
FIG. 1 is a side elevational view of an exemplary embodiment of a breathable sheet.

As shown in FIG. 1, a breathable sheet 10a according to an exemplary embodiment is disclosed. The breathable sheet 10a includes a first breathable polymer layer 12a. Adjacent to the first breathable polymer layer 12a is a first nonwoven layer 22a. The first nonwoven layer 22a is sandwiched by the first breathable polymer layer 12a and a second breathable polymer layer 14a. Adjacent to the second breathable polymer layer 14a is a second nonwoven layer 24a. The second nonwoven layer 24a is sandwiched by the second breathable polymer layer 14a and a third breathable polymer layer 16a. Embedded in the second breathable polymer layer 14a is an open-mesh reinforcing fabric that includes a plurality of strands 32a aligned in a first direction and a plurality of strands 34a aligned in a second direction. The plurality of strands 32a and the plurality of strands 34a may, for example, be orthogonal to each other. The plurality of strands 32a and the plurality of strands 34a are spaced apart to allow for a gap between the strands. While the open-mesh reinforcing fabric is shown as a cross-laid fabric in FIG. 1, other suitable open-mesh reinforcing fabrics, discussed in further detail below, may be used in the breathable sheet.

Figure 2:
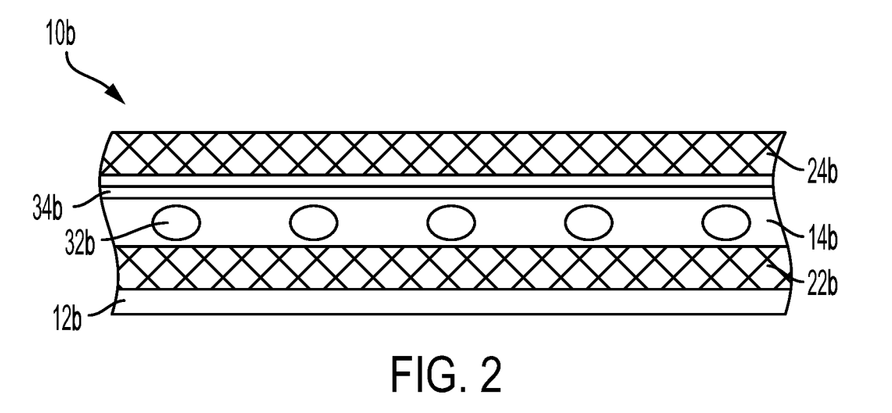
FIG. 2 is a side elevational view of an exemplary embodiment of a breathable sheet.

As shown in FIG. 2, a breathable sheet 10b according to one or more embodiments is disclosed. The breathable sheet 10b is similar to the breathable sheet 10a disclosed in FIG. 1, except the breathable sheet 10b does not include a third breathable polymer layer, such as the third breathable polymer layer 16a, and a second nonwoven layer 24b is exposed. The breathable sheet 10b includes a first breathable polymer layer 12b. Adjacent to the first breathable polymer layer 12b is a first nonwoven layer 22b. The first nonwoven layer 22b is sandwiched by the first breathable polymer layer 12b and a second breathable polymer layer 14b. Adjacent to the second breathable polymer layer 14b is a second nonwoven layer 24b. Embedded in the second breathable polymer layer 14b is an open-mesh reinforcing fabric that includes a plurality of strands 32b aligned in a first direction and a plurality of strands 34b aligned in a second direction. The plurality of strands 32b and the plurality of strands 34b may, for example, be orthogonal to each other. The plurality of strands 32b and the plurality of strands 34b are spaced apart to allow for a gap between the strands. While the open-mesh reinforcing fabric is shown as a cross-laid fabric in FIG. 2, other suitable open-mesh reinforcing fabrics, discussed in further detail below, may be used in the breathable sheet. In one or more embodiments, such as those where the breathable sheet is used as a roofing underlayment, the exposed nonwoven layer 24b may provide increased traction for walking during roofing installation. In these or other embodiments, the first breathable polymer layer 12b has a high coefficient of friction with a roofing deck that helps the breathable sheet 10b grip the roofing deck.

Figure 3:
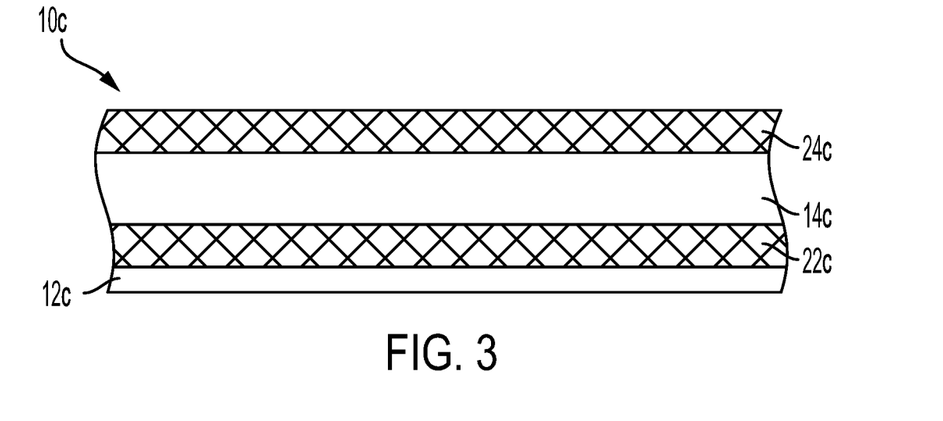
FIG. 3 is a side elevational view of an exemplary embodiment of a breathable sheet.

As shown in FIG. 3, a breathable sheet 10c according to one or more embodiments is disclosed. The breathable sheet 10c is similar to the breathable sheet 10b disclosed in FIG. 2, except the breathable sheet 10c does not include an open-mesh reinforcing fabric. The breathable sheet 10c includes a first breathable polymer layer 12c. Adjacent to the first breathable polymer layer 12c is a first nonwoven layer 22c. The first nonwoven layer 22c is sandwiched by the first breathable polymer layer 12c and a second breathable polymer layer 14c. Adjacent to the second breathable polymer layer 14c is a second nonwoven layer 24c. In one or more embodiments, such as those where the breathable sheet is used as a roofing underlayment, the exposed nonwoven layer 24c may provide increased traction for walking during roofing installation. In these or other embodiments, the first breathable polymer layer 12c has a high coefficient of friction with a roofing deck that helps the breathable sheet 10c grip the roofing deck.

Figure 4:
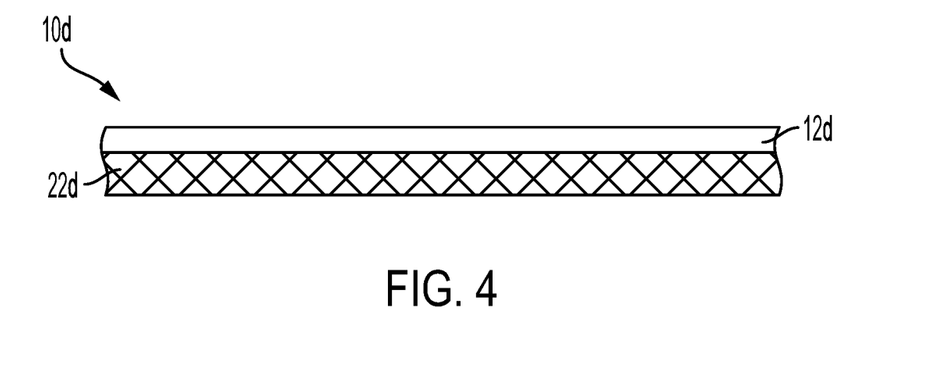
FIG. 4 is a side elevational view of an exemplary embodiment of a breathable sheet.

As shown in FIG. 4, a breathable sheet 10d according to one or more embodiments is disclosed. The breathable sheet 10d includes a breathable polymer layer 12d. Adjacent to the first breathable polymer layer 12d is a nonwoven layer 22d.

As indicated above, the breathable sheets (e.g., the breathable sheet 10a, 10b, 10c, and 10d) include at least one breathable polymer layer. Herein, the composition of the breathable polymer layer may be referred to as the breathable polymer composition. In one or more embodiments, the breathable polymer composition includes one or more polymers and, optionally, one or more additives. Suitable polymer compositions for use as the breathable polymer composition in the breathable sheet include polymer compositions that impart water-resistant properties to the breathable sheet material without being so restrictive that air and water vapor cannot pass through the breathable sheet. In embodiments where the breathable sheet includes more than one breathable polymer layers, each breathable polymer layer may have the same or a different breathable polymer composition. Accordingly, unless specified otherwise, reference to the term "breathable polymer composition" may refer to a composition used for a single, multiple, or all of the breathable polymer layers in an embodiment of the breathable sheet. In certain embodiments, the breathable polymer layer may be selected to have an inherent grip.

In one or more embodiments, the breathable polymer composition may include a polymer that is inherently breathable. Examples of inherently breathable polymers include, but are not limited, to olefin-acrylate copolymers, thermoplastic polyurethanes (TPU), thermoplastic copolyesters, and combinations thereof.

In one or more embodiments, the breathable polymer composition may include an olefin-acrylate copolymer. Olefin-acrylate copolymers may be prepared by the reaction of an olefin monomer with an alkyl acrylate monomer. In one or more embodiments, the olefin-acrylate copolymer may be a random copolymer. In other embodiments, the olefin-acrylate copolymer may be a block copolymer. Suitable olefins for use in the olefin-akrylate co-polymer include olefins have from 2-6 carbon atoms. Specific examples of olefins suitable for use in the olefin-acrylate copolymers include, but are not limited to, ethylene, propene, 1-butene, and combinations thereof. Specific examples of acrylates for use in the olefin-acrylate copolymers include, but are not limited to, methyl acrylate, ethyl acrylate, butyl acrylate, and combinations thereof. Specific examples of olefin-acrylate copolymers include, but are not limited to, ethylene-methyl acrylate copolymers, ethylene-ethyl acrylate copolymers, ethylene-butyl acrylate copolymers, and combinations thereof. Specific examples of commercially available olefin-acrylate copolymers include, but are not limited to, ELVALOY® from DuPont and LOTRYL® from Arkema.

In one or more embodiments, the olefin-acrylate copolymer may be characterized by the weight percent of the acrylate mer unit (i.e. the reaction product of the polymerization of an alkyl acrylate monomer) in the total weight of the olefin-acrylate copolymer. In these or other embodiments, the weight percent of the acrylate mer unit in the olefin-acrylate copolymer may be determined by Fourier-transform infrared spectroscopy (FTIR). In one or more embodiments, the olefin-acrylate copolymer may include greater than 10 wt %, in other embodiments greater than 15 wt %, and in other embodiments greater than 20 wt % acrylate mer units. In one or more embodiments, the olefin-acrylate copolymer may include less than 40 wt %, in other embodiments less than 35 wt %, and in other embodiments less than 30 wt % acrylate mer units. In one or more embodiments, the olefin-acrylate copolymer may include acrylate mer units in the range of 10 wt % to 40 wt %, in other embodiments in the range of 15 wt % to 35 wt %, and in other embodiments in the range of 20 wt % to 30 wt %.

In one or more embodiments, the breathable polymer composition may be characterized by the percent weight of the olefin-acrylate copolymer out of the total weight of the breathable polymer composition. In one or more embodiments, the entire breathable polymer composition may consist of the olefin-acrylate copolymer. In one or more embodiments, the breathable polymer composition may include less than 99.9 wt %, in other embodiments less than 99.5 wt %, in other embodiments less than 99 wt %, in other embodiments less than 80 wt %, and in other embodiments less than 70 wt % of the olefin-acrylate copolymer. In one or more embodiments, the breathable polymer composition may include greater than 20 wt %, in other embodiments greater than 25 wt %, in other embodiments greater than 30 wt %, in other embodiments greater than 40 wt %, and in other embodiments greater than 45 wt % of the olefin-acrylate copolymer. In one or more embodiments, the olefin-acrylate copolymer may be in the breathable polymer composition in the range of 20 wt % to 99.9 wt %, in other embodiments in the range of 25 wt % to 99.5 wt %, in other embodiments in the range of 30 wt % to 99 wt %, in other embodiments in the range of 40 wt % to 80 wt %, and in other embodiments in the range of 45 wt % to 70 wt %.

Those skilled in the art will appreciate that thermoplastic polyurethanes are prepared by reacting diisocyanates with short-chain diols (also referred to as chain extenders) and diisocyanates with long-chain diols to form a thermoplastic polymer that includes hard and soft segments. Examples of thermoplastic polyurethanes are disclosed in U.S. Pat. No. 8,309,211, which is incorporated herein by reference in its entirety. Specific examples of commercially available thermoplastic polyurethanes include, but are not limited to, ESTHANE® from Noveon, PEARLTHANE®/PEARL-COAT® from Merquinsa NA, PELLETHANE® from Dow Chemical Company, BASF ELASTOLLAN® from BASF, TEXIN/DESMOPAN® from Bayer, and AVALON® and IROGRAN® from Huntsman.

In one or more embodiments, the breathable polymer composition may be characterized by the percent weight of thermoplastic polyurethanes out of the total weight of the breathable polymer composition. In one or more embodiments, the breathable polymer composition may include less than 99.9 wt %, in other embodiments less than 99.5 wt %, in other embodiments less than 99 wt %, in other embodiments less than 85 wt %, in other embodiments less than 80 wt %, and in other embodiments less than 75 wt % of the thermoplastic polyurethanes In one or more embodiments, the breathable polymer composition may include greater than 30 wt %, in other embodiments greater than 40 wt %, and in other embodiments greater than 60 wt % of the thermoplastic polyurethane. In one or more embodiments, the thermoplastic polyurethane may be in the breathable polymer composition in the range of 30 wt % to 85 wt %, in other embodiments in the range of 40 wt % to 80 wt %, and in other embodiments in the range of 60 wt % to 75 wt %.

In one or more embodiments, the breathable polymer composition may include a thermoplastic copolyesters. In one or more embodiments, the thermoplastic copolyester may include hard segments, such as, for example polybutylene terephthalate, and soft segments. Specific examples of commercially available thermoplastic copolyesters include ARNITEL® from DSM.

In one or more embodiments, the breathable polymer composition may be characterized by the percent weight of thermoplastic copolyesters out of the total weight of the breathable polymer composition. In one or more embodiments, the breathable polymer composition may include less than 99.9 wt %, in other embodiments less than 99.5 wt %, in other embodiments less than 99 wt %, in other embodiments less than 85 wt %, in other embodiments less than 80 wt %, and in other embodiments less than 75 wt % of the thermoplastic copolyester. In one or more embodiments, the breathable polymer composition may include greater than 30 wt %, in other embodiments greater than 40 wt %, and in other embodiments greater than 60 wt % of the thermoplastic copolyester. In one or more embodiments, the thermoplastic copolyester may be in the breathable polymer composition in the range of 30 wt % to 85 wt %, in other embodiments in the range of 40 wt % to 80 wt %, and in other embodiments in the range of 60 wt % to 75 wt %.

In one or more embodiments, the breathable polymer composition may include an inherently breathable polymer and one or more additional polymers. Exemplary polymers that may be included either separately or in combination with the inherently breathable polymer include ethylene-acrylate ester-maleic anhydride terpolymers, polyether block amide, and combinations thereof.

In certain embodiments, the breathable polymer composition may include an olefin-acrylate copolymer and an ethylene-acrylate ester-maleic anhydride terpolymer. In certain embodiments, the breathable polymer composition may include an olefin-acrylate copolymer and a polyether block amide. In certain embodiments, the breathable polymer composition may include an olefin-acrylate copolymer, an ethylene-acrylate ester-maleic anhydride terpolymer, and a polyether block amide. In certain embodiments, the breathable polymer composition may include a thermoplastic polyurethane and an ethylene-acrylate ester-maleic anhydride terpolymer. In certain embodiments, the breathable polymer composition may include a thermoplastic polyurethane and a polyether block amide. In certain embodiments, the breathable polymer composition may include a thermoplastic polyurethane, an ethylene-acrylate ester-maleic anhydride terpolymer, and a polyether block amide. In certain embodiments, the breathable polymer composition may include a thermoplastic copolyester and an ethylene-acrylate ester-maleic anhydride terpolymer. In certain embodiments, the breathable polymer composition may include a thermoplastic copolyester and a polyether block amide. In certain embodiments, the breathable polymer composition may include a thermoplastic copolyester, an ethylene-acrylate ester-maleic anhydride terpolymer, and a polyether block amide.

In one or more embodiments, the breathable polymer composition may include an ethylene-acrylate ester-maleic anhydride terpolymer. Specific examples of commercially available ethylene-acrylate ester-maleic anhydride terpolymers include LOTADER® from Arkema. In these or other embodiments, the breathable polymer composition may be characterized by the percent weight of the ethylene-acrylate ester-maleic anhydride terpolymer out of the total weight of the breathable polymer composition. In one or more embodiments, the breathable polymer composition may include less than 5 wt %, in other embodiments less than 3 wt %, and in other embodiments less than 2 wt % of the ethylene-acrylate ester-maleic anhydride terpolymer. In one or more embodiments, the breathable polymer composition may include greater than 0.1 wt %, in other embodiments greater than 0.5 wt %, and in other embodiments greater than 1 wt % of the ethylene-acrylate ester-maleic anhydride terpolymer. In one or more embodiments, the ethylene-acrylate ester-maleic anhydride terpolymer may be in the breathable polymer composition in the range of 0.1 wt % to 5 wt %, in other embodiments in the range of 0.5 wt % to 3 wt %, and in other embodiments in the range of 1 wt % to 5 wt %.

In one or more embodiments, the breathable polymer composition may include a polyether block amide. Polyether block amides are block copolymers prepared by polycondensation of a carboxylic acid polyamide with an alcohol termination polyether. Suitable carboxylic acid polyamide include, but are not limited to, PA6, PA11, and PA12. Suitable alcohol termination polyether include, but are not limited to, polytetramethylene glycol, and polyethylene glycol. Specific examples of commercially available polyether block amides include PEBAX® from Arkema and VESTAMID® from Evonik Industries. In these or other embodiments, the breathable polymer composition may be characterized by the percent weight of the polyether block amides out of the total weight of the breathable polymer composition. In one or more embodiments, the breathable polymer composition may include less than 75 wt %, in other embodiments less than 65 wt %, in other embodiments less than 60 wt %, in other embodiments less than 40 wt %, and in other embodiments less than 30 wt % of the polyether block amides. In one or more embodiments, the breathable polymer composition may include greater than 1 wt %, in other embodiments greater than 3 wt %, in other embodiments greater than 5 wt %, in other embodiments greater than 10 wt %, and in other embodiments greater than 15 wt % of the polyether block amides. In one or more embodiments, the polyether block amides may be in the breathable polymer composition in the range of 1 wt % to 75 wt %, in other embodiments in the range of 3 wt % to 65 wt %, in other embodiments in the range of 5 wt % to 60 wt %, in other embodiments in the range of 10 wt % to 40 wt %, and in other embodiments in the range of 15 wt % to 30 wt %.

In one or more embodiments, the breathable polymer layer may be a microporous polymer layer. Those skilled in the art will appreciate that a microporous polymer is polymer composition that includes induced micropores.

Micropores may be induced, for example, by the inclusion of fillers and/or stretching the polymer under appropriate conditions.

Examples of polymers suitable for use in the microporous polymer layer include, but are not limited to polyesters (e.g. polyethylene terephthalate, polybutylene terephthalate) polyolefins (e.g. polyethylene, polypropylene), polystyrenes, polyvinylchlorides, polyurethanes, polyether block amides, ethylene acrylic acid, and combinations thereof.

Suitable optional components for use in the breathable polymer composition include fillers, pigments, UV stabilizers, flame retardants, process aids, and combinations thereof.

In one or more embodiments, the breathable polymer composition may be characterized by the percent weight of the polymer component (i.e. total weight of all polymers) out of the total weight of the breathable polymer composition. In one or more embodiments, breathable polymer composition consists entirely of polymer. In one or more embodiments, the breathable polymer composition may include greater than 90 wt %, in other embodiments greater than 95 wt %, in other embodiments greater than 97 wt %, in other embodiments greater than 98 wt %, in other embodiments greater than 99 wt %, and in other embodiments greater than 99.9 wt % of the polymer component. In one or more embodiments, the polymer component may be in the breathable polymer composition in the range of 90 wt % to 99.9 wt %, in other embodiments in the range of 95 wt % to 99 wt %, and in other embodiments in the range of 97 wt % to 98 wt %.

The breathable polymer layer may be formed in and/or on the breathable sheet in a wide variety of different ways. For example, the breathable polymer layer may be applied to during the construction of the breathable sheet by extrusion coating, extrusion lamination, air spraying, dip coating, knife coating, roll coating and/or applied as a preformed film by heat pressing, calendaring, needling, ultrasonic bonding or welding, adhesives, tie layers, and/or point bonding. The breathable polymer layer may also be bonded to one or more of the other layers by chemical bonding, mechanical bonding and/or thermal bonding. Mechanical bonding may be achieved by force-feeding the breathable polymer composition onto the other layers of the sheet 10 with a knife or by penetrating some or all of the layers of the sheet (e.g. needle punching).

In one or more embodiments, the breathable polymer layer (i.e. a single layer of the breathable polymer composition) may be characterized by a MTVR. In one or more embodiments the breathable polymer layer has a MTVR of greater than 1 perm, in other in other embodiments greater than 2 perms, embodiments greater than 3 perms, in other embodiments greater than 5 perms, in other embodiments greater than 7 perms, in other embodiments greater than 8 perms, and in other embodiments greater than 10 perms. In one or more embodiments the breathable polymer layer has a MTVR of less than 150 perms, in other embodiments less than 100 perms, in other embodiments less than 60 perms, in other embodiments less than 30 perms, in other embodiments less than 20 perms, in other embodiments less than 15 perms, and in other embodiments less than 12 perms. In one or more embodiments the breathable polymer layer has MTVR in the range of 1 perm to 150 perms, in other embodiments in the range of 2 perms to 100 perms, in other embodiments in the range of 3 perms to 60 perms, in other embodiments in the range of 5 perms to 30 perms, in other embodiments in the range of 7 perms to 20 perms, and in other embodiments in the range of 10 perms to 12 perms.

In one or more embodiments, the breathable polymer layer may be characterized by its thickness. In one or more embodiments, the thickness of the breathable polymer layer may be in the range of 0.1 mils to 25 mils, in other embodiments in the range of 0.2 mils to 15 mils, in other embodiments in the range of 0.2 mils to 10 mils, in other embodiments in the range of 0.3 mils to 3 mils, in other embodiments in the range of 0.4 mils to 2 mils, in other embodiments in the range of 0.5 mils to 1.5 mils, and in other embodiments in the range of 0.6 mils to 1 mil. In certain embodiments, such as those embodiments where the breathable layer includes an embedded open-mesh reinforcing fabric, the breathable polymer layer may have a variable or uneven thickness. In these or other embodiments, the thickest portion of the breathable polymer layer may be used to determine the thickness of the layer.

In one or more embodiments, the breathable polymer layer may be characterized by a MTVR at a specific thickness of the breathable polymer layer. In one or more embodiments the breathable polymer layer may have a thickness of 1 mil and MTVR in the range of 7 perms to 11 perms, in other embodiments the range of 7.5 perms to 10.5 perms, and in other embodiments in the range of 8 perms to 10 perms. In one or more embodiments the breathable polymer layer may have a thickness of 0.8 mil and MTVR in the range of 9 perms to 15 perms, in other embodiments the range of 10 perms to 14 perms, and in other embodiments in the range of 11 perms to 13 perms. In one or more embodiments the breathable polymer layer may have a thickness of 0.6 mil and MTVR in the range of 17 perms to 23 perms, in other embodiments the range of 18 perms to 22 perms, and in other embodiments in the range of 19 perms to 21 perms.

In one or more embodiments, the breathable polymer layer may be characterized by the area weight of the layer in grams per square meter (gsm). In one or more embodiments, the area weight of the breathable polymer layer may be in the range of 5 gsm to 80 gsm, in other embodiments in the range of 7 gsm to 60 gsm, in other embodiments in the range of 10 gsm to 50 gsm, in other embodiments in the range of 12 gsm to 35 gsm, and in other embodiments in the range of 15 gsm to 30 gsm.

As indicated above, the breathable sheets (e.g., the breathable sheet 10a, 10b, 10c, and 10d) include at least one nonwoven layer. In embodiments where the breathable sheet includes more than one nonwoven layer, each nonwoven layer may have the same or a different characteristics and properties. Accordingly, unless specified otherwise, reference to the term "nonwoven layer" may refer to a single, multiple, or all of the nonwoven layers in an embodiment of the breathable sheet. Due to the structure of the nonwoven layer, the nonwoven layer has a very high MTVR (potentially higher by an order of magnitude or more than the breathable polymer layer).

In one or more embodiments, the nonwoven layer may be a polymeric nonwoven layer. The method of preparing the polymeric nonwoven is not particularly limited. Suitable polymeric nonwovens include, are not limited to, spunmelt nonwovens, melt-blown nonwovens, spunbond nonwovens (also referred to as spunlaid), and flashspun nonwovens.

In one or more embodiments, the nonwoven layer may be a melt-blown nonwoven layer. In these or other embodiment, the melt-blown nonwoven layer may be prepared by extruding melted polymer fibers out of a die that includes of a plurality of holes. The melted polymer fibers exit the die into a high velocity, usually hot, stream of air which attenuate the melted polymer fibers to reduce their diameter. The fibers are then collected in a web and may subsequently be bonded together.

In one or more embodiments, the fibers of the melt-blown nonwoven layer may be characterized by their diameter. In these or other embodiments, the fibers of the melt-blown nonwoven layer may have a diameter in the range of 10 microns to 30 microns, in other embodiments, in the range of 12 microns to 28 microns, and in other embodiments in the range of 15 microns to 20 microns.

In one or more embodiments, the nonwoven layer may be a spunbond nonwoven layer. In these or other embodiment, the spunbond nonwoven layer may be prepared by extruding melted polymer through a spinnerette to form a fiber. The fibers are subsequent quenched, for example, with low temperature air, and then collected. The fibers may subsequently be bonded together.

In one or more embodiments, the fibers of the spunbond nonwoven layer may be characterized by their diameter. In these or other embodiments, the fibers of the spunbond nonwoven layer may have a diameter in the range of 10 microns to 50 microns, in other embodiments, in the range of 15 microns to 45 microns, and in other embodiments in the range of 20 microns to 40 microns.

Regardless of how the nonwoven is formed, the fibers of the nonwoven may be bonded. The fibers are typically chemically bonded or bonded by using heat and/or pressure. In one or more embodiments, the nonwoven may be point bonded. Point bonded nonwovens are bonded, for example, using heated nips on rolls, usually in the form of a pattern, to bond certain points on the nonwoven and leave other portions lose or unbonded.

Suitable polymers for use in the nonwoven include, but are not limited to, polyolefins, such as, for example, polyethylene and polypropylene; polyethylene terephthalate (PET); polyamides; polyvinyl chlorides (PVCs); polystyrenes; polyacrylics; and combinations thereof.

Specific examples of polyethylenes include low density polyethylenes, medium density polyethylenes, and high density polyethylenes. Those skilled in the art will appreciate that term "high density polyethylene" denotes a polyethylene composition having a density of 0.941 g/cc or higher; the term "medium density polyethylene" denotes a polyethylene composition having a density of 0.926 to 0.940 g/cc; and the terms "low density or linear low density polyethylene" denote a polyethylene composition having a density of 0.90 to 0.925 g/cc.

In one or more embodiments, the nonwoven layer may be characterized by its thickness. In one or more embodiments, the thickness of the nonwoven layer may be in the range of 1 mill to 40 mills, in other embodiments in the range of 2 mills to 30 mils, in other embodiments in the range of 3 mills to 20 mils, in other embodiments in the range of 4 mills to 20 mils, and in other embodiments in the range of 5 mills to 15 mills.

In one or more embodiments, the nonwoven layer may be characterized by the area weight of the layer in grams per square meter (gsm). In one or more embodiments, the area weight of the nonwoven layer may be in the range of 5 gsm to 60 gsm, in other embodiments in the range of 8 gsm to 45 gsm, in other embodiments in the range of 10 gsm to 40 gsm, in other embodiments in the range of 15 gsm to 35 gsm, and in other embodiments in the range of 20 gsm to 30 gsm.

As indicated above, the breathable sheet (e.g., the breathable sheet 10a and 10b) may include an open-mesh reinforcing fabric. Advantageously, the open-mesh reinforcing fabric imparts strength to breathable sheet while allowing the sheet to still have suitable breathable properties. Due to the open structure, the open-mesh reinforcing fabric has a very high MTVR.

While the open-mesh reinforcing fabric may be formed from fibers, strands, filaments, or tapes, the term "stands" will be used for simplicity of description. In one or more embodiments, the strands of the open-mesh reinforcing fabric may be woven or laid. In certain embodiments, where the open-mesh reinforcing fabric is woven, a leno weave may be used to form the open-mesh reinforcing fabric. Suitable materials for forming the open-mesh reinforcing fabric include glass, metal, polymers, and combinations thereof. Examples of polymers that may be used in the open-mesh reinforcing fabric include, but are not limited to, polyesters, polyethylene terephthalate, polyethylene terephthalate, polyethylene, polypropylene, polyvinyl chloride, and polyurethane.

Figure 5:
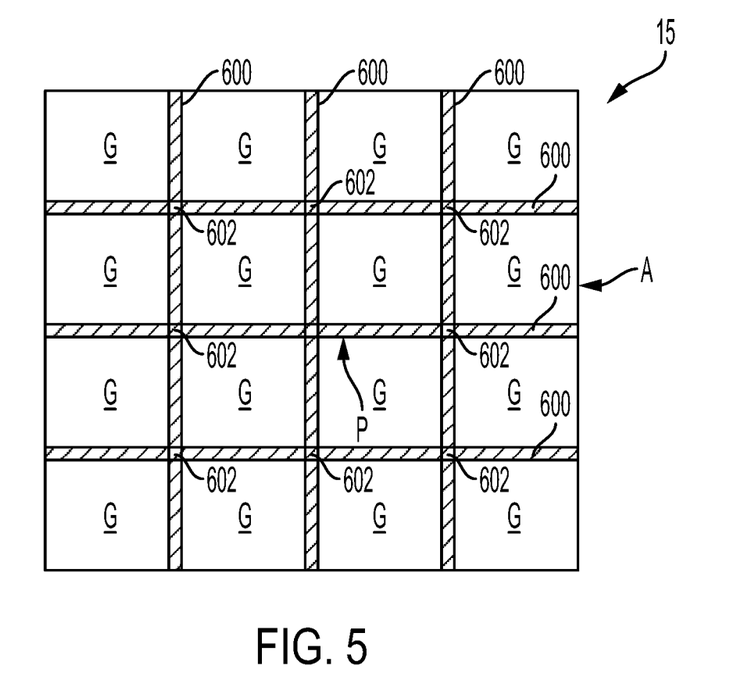
FIG. 5 is a top plan view of an exemplary embodiment of an open-mesh reinforcing fabric.
Figure 6:
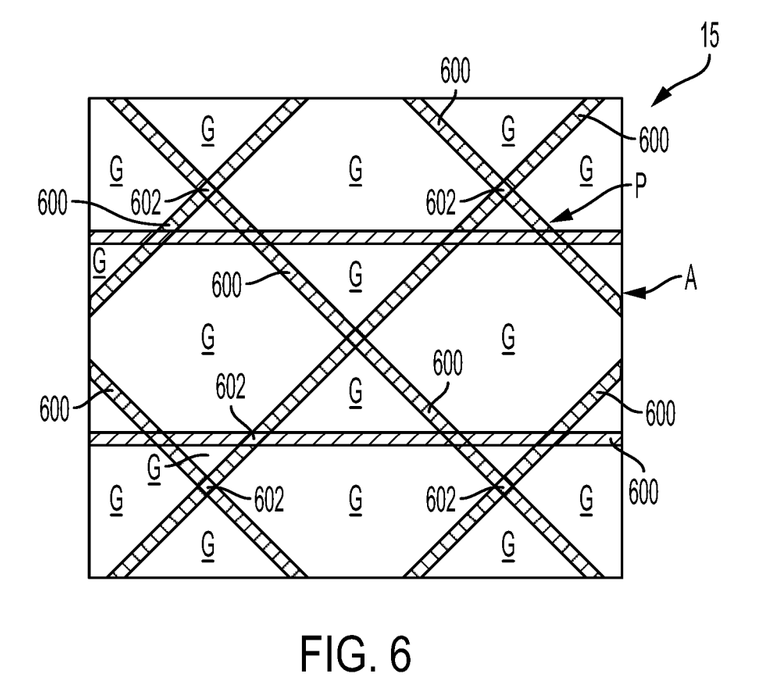
FIG. 6 is a top plan view of an exemplary embodiment of an open-mesh reinforcing fabric.

As shown in FIGS. 5 and 6, an open-mesh reinforcing fabric 15 according to one or more embodiments is disclosed. The open-mesh reinforcing fabric 15 includes strands 600 of material that are oriented in a crossing pattern P. The crossing pattern P forms openings or gaps G between the crossing strands. The strands 600 can be joined together at some or all of the intersections 602 between the strands to add strength to the reinforcement fabric 15. The strands 600 can optionally be woven or the strands in each direction can simply be placed on strands that extend in another direction.

The open-mesh reinforcing fabric 15 is open, meaning that for a given total two-dimensional area A (i.e. the area illustrated in the boxes in FIGS. 5 and 6), the portion of the area A occupied by the strands 600 is less than the portion of the area of the gaps G. In one or more embodiments, the portion of the area A occupied by the strands 600 is less than 50%, in other embodiments less than 40%, in other embodiments less than 30%, in other embodiments less than 20%, in other embodiments less than 10%, in other embodiments less than 7%, in other embodiments less than 5%, in other embodiments less than 4%, in other embodiments less than 3%, in other embodiments less than 2%, and in other embodiments less than 1%.

In one or more embodiments, the open-mesh reinforcing fabric may be a cross-laid glass scrim. In one or more embodiments, the cross-laid glass scrim includes at least two glass strands oriented in different directions and bonded together. In one or more embodiments, the cross-laid glass scrim includes a first plurality of glass strands oriented in one direction and a second plurality of glass strands may be oriented in the 90° or cross direction with respect to the first plurality of glass strands. In one or more embodiments, additional glass strands may be oriented at an angle other than 90° with respect to the first plurality of glass strands. Suitable orientations for the strands of the cross-laid glass scrim include, but are not limited to, square in a side-by-side orientation, square in an over-under orientation, tri-directional, and quad-directional.

In one or more embodiments, the open-mesh reinforcing fabric may be characterized by the spacing of the strands in a parallel direction (i.e. the distance between two consecutive parallel strands). In one or more embodiments, parallel stands of the open-mesh reinforcing fabric may be spaced greater than 0.2 cm apart, in other embodiments greater than 0.5 cm apart, in other embodiments greater than 0.8 cm apart, and in other embodiments greater than 1 cm apart. In one or more embodiments, parallel stands of the open-mesh reinforcing fabric may be spaced less than 3 cm apart, in other embodiments less than 2.5 cm apart, in other embodiments less than 2 cm apart, and in other embodiments less than 1.5 cm apart. In one or more embodiments, parallel stands of the open-mesh reinforcing fabric may be spaced apart in the range of 0.2 cm to 3 cm, in other embodiments in the range of 0.5 cm to 2.5 cm, in other embodiments in the range of 0.8 cm to 2 cm, and in other embodiments in the range of 1 cm to 1.5 cm.

In one or more embodiments, the breathable sheet may be prepared by adding each layer individually to build up the breathable sheet. In these or other embodiments, a breathable polymer layer may be laminated to onto a nonwoven layer. Each additional layer, such as, for example a second nonwoven layer or second breathable polymer layer, is then laminated in succession. In embodiments that include a cross-laid glass scrim, the cross-laid glass scrim is include between, for example a breathable coating and a nonwoven layer, and is embedded in the breathable coating during the lamination process. In other embodiments, all of the layers may be stacked or arranged together and laminated in a single lamination process. Similarly, in embodiments that include a cross-laid glass scrim, the cross-laid glass scrim is include between, for example a breathable coating and a nonwoven layer, and is embedded in the breathable coating during the lamination process. In one or more embodiments, the layers may be bonded by chemical bonding, mechanical bonding and/or thermal bonding. Exemplary methods of bonding the layers include, but are not limited to, heat pressing, calendaring, needling, ultrasonic bonding or welding, adhesives, tie layers, and/or point bonding.

In one or more embodiments, the breathable sheet may be characterized by a MTVR. In one or more embodiments the breathable sheet has a MTVR of greater than 1 perm, in other in other embodiments greater than 2 perms, embodiments greater than 3 perms, in other embodiments greater than 5 perms, in other embodiments greater than 7 perms, in other embodiments greater than 8 perms, and in other embodiments greater than 10 perms. In one or more embodiments the breathable sheet has a MTVR of less than 150 perms, in other embodiments less than 100 perms, in other embodiments less than 60 perms, in other embodiments less than 30 perms, in other embodiments less than 20 perms, in other embodiments less than 15 perms, and in other embodiments less than 12 perms. In one or more embodiments the breathable sheet has MTVR in the range of 1 perm to 150 perms, in the range of 2 perms to 100 perms, in other embodiments in the range of 3 perms to 60 perms, in other embodiments in the range of 5 perms to 30 perms, in other embodiments in the range of 7 perms to 20 perms, and in other embodiments in the range of 10 perms to 12 perms.

In one or more embodiments, the breathable sheet may be characterized by the area weight in grams per square meter. In one or more embodiments, the area weight of the breathable sheet may be less than 300 gsm, in other embodiments less than 280 gsm, in other embodiments less than 260 gsm, in other embodiments less than 220 gsm, in other embodiments less than 200 gsm, in other embodiments less than 180 gsm, in other embodiments less than 160 gsm, in other embodiments less than 140 gsm, and in other embodiments less than 120 gsm. In one or more embodiments, the area weight of breathable sheet may be greater than 80 gsm, in other embodiments greater than 90 gsm, in other embodiments greater than 100 gsm, in other embodiments greater than 110 gsm, in other embodiments greater than 120 gsm, in other embodiments greater than 130 gsm, and in other embodiments greater than 140 gsm. In one or more embodiments, the area weight of the breathable sheet may be in the range of 80 gsm to 120 gsm, in other embodiments in the range of 85 gsm to 115 gsm, in other embodiments in the range of 90 gsm to 110 gsm, and in other embodiments in the range of 95 gsm to 105 gsm. In one or more embodiments, the area weight of the breathable sheet may be in the range of 80 gsm to 160 gsm, in other embodiments in the range of 85 gsm to 150 gsm, in other embodiments in the range of 90 gsm to 140 gsm, and in other embodiments in the range of 95 gsm to 130 gsm. In one or more embodiments, the area weight of the breathable sheet may be in the range of 120 gsm to 300 gsm, in other embodiments in the range of 130 gsm to 280 gsm, in other embodiments in the range of 140 gsm to 240 gsm, in other embodiments in the range of 150 gsm to 220 gsm, and in other embodiments in the range of 160 gsm to 200 gsm In one or more embodiments, the breathable sheet may be characterized by its thickness. In one or more embodiments, the thickness of the breathable sheet may be less than 50 mils, in other embodiments less than 45 mils, in other embodiments less than 40 mils, in other embodiments less than 35 mils, in other embodiments less than 30 mils, in other embodiments less than 25 mils, in other embodiments less than 20 mils, and in other embodiments less than 15 mils. In one or more embodiments, the thickness of the breathable sheet may be greater than 15 mils, in other embodiments greater than 16 mils, in other embodiments greater than 17 mils, in other embodiments greater than 18 mils, in other embodiments greater than 19 mils, in other embodiments greater than 20 mils, in other embodiments greater than 21 mils, in other embodiments greater than 22 mils, in other embodiments less than 23 mils, in other embodiments greater than 24 mils, and in other embodiments greater than 25 mils. In one or more embodiments, the thickness of the breathable sheet may be in the range of 25 mils to 35 mils, in other embodiments in the range of 27 mils to 33 mils, and in other embodiments in the range of 28 mils to 32 mils. In one or more embodiments, the thickness of the breathable sheet may be in the range of 15 mils to 20 mils, in other embodiments in the range of 16 mils to 19.5 mils, and in other embodiments in the range of 17 mils to 19 mils. In one or more embodiments, the thickness of the breathable sheet may be in the range of 20 mils to 30 mils, in other embodiments in the range of 22.5 mils to 27.5 mils, and in other embodiments in the range of 23 mils to 26 mils.

In certain embodiments, the breathable sheet may be characterized by tensile strength and elongation impact. In one or more embodiments, where the breathable polymer sheet includes an open-mesh reinforcing fabric, the breathable polymer sheet may exhibit two, distinct tensile strength peaks at different percent elongations. For example, the breathable sheet may have a first tensile strength peak at 3% to 5% elongation and a second tensile strength peak at approximately 70% elongation. Accordingly, these embodiments have high strength at low elongations plus secondary strength at the higher elongations In one or more embodiments, the breathable sheet may be used in a wall system.

Figure 7:
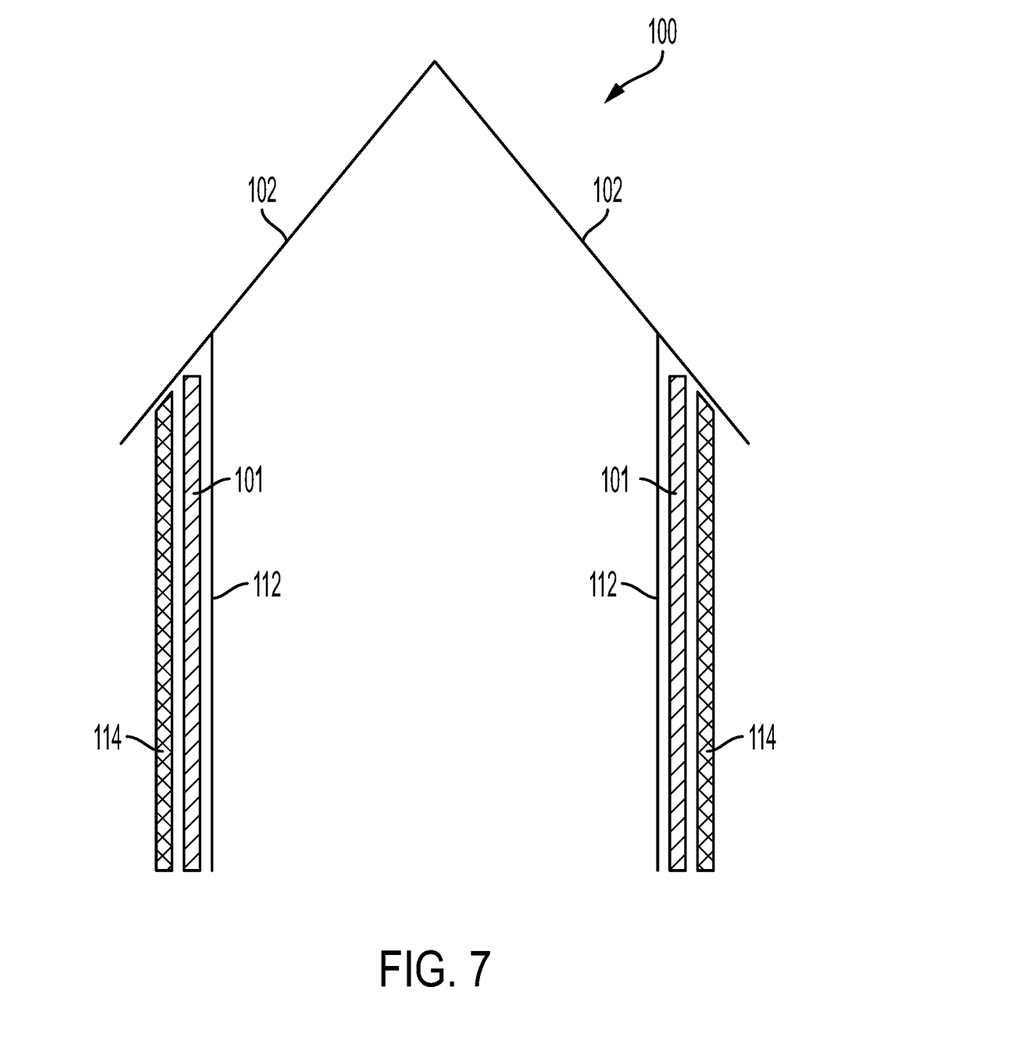
FIG. 7 is a side elevational view of an exemplary embodiment of a wall system.

FIG. 7 illustrates a building 100 that uses a breathable sheet 101 (e.g. the sheet 10a, 10b, 10c, or 10d) as a building wrap. The building 100 includes structural supports 112, such as vertical studs and/or sheathing panels attached to the vertical studs. In certain embodiments, the building 100 does not include sheathing panels. The sheet material 101 is disposed on the structural supports 112. Exterior wall covering material 114, such as siding, is attached to the structural supports 112, with the sheet material 101 disposed between the exterior wall covering material 114 and the structural supports 112. The sheet material 101 is configured to prevent any liquid water that may come into contact with the sheet material from passing through the sheet material. The sheet material 101 is also breathable, so that any water that is trapped inside the sheet material can become water vapor and pass through the sheet material.

In one or more embodiments, the breathable sheet may be used in a roofing system.

Figure 8:
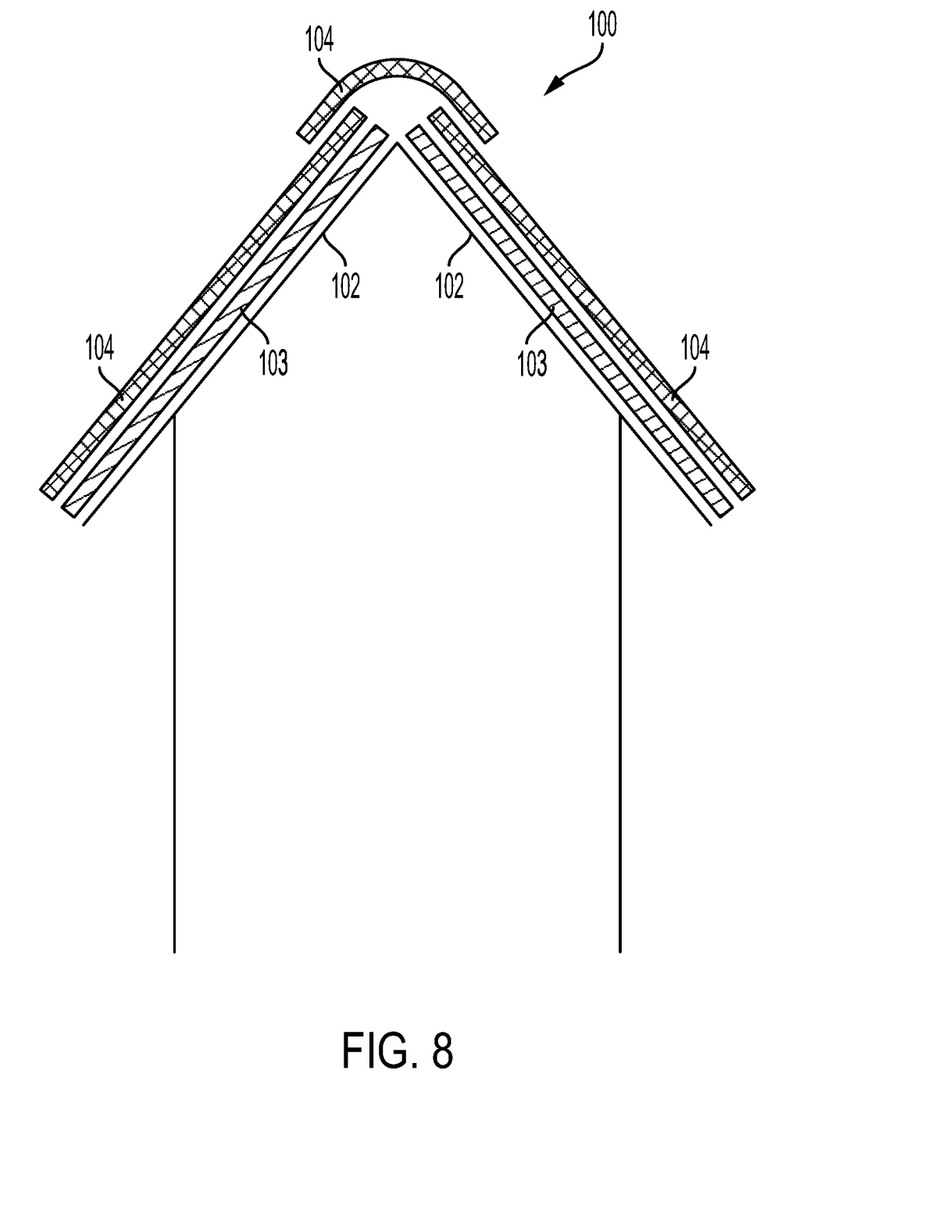
FIG. 8 is a side elevational view of an exemplary embodiment of a roofing system.

FIG. 8 illustrates a building 100 that uses a breathable sheet 103 (e.g. the sheet 10a, 10b, 10c, or 10d) as a roofing underlayment. The building 100 includes a roof deck 102. The breathable sheet 103 is disposed on the roof deck 102, for example, the breathable sheet 103 can be attached to the roof deck 102 with nails or staples. Roofing material 104, such as shingles, is attached to the roof deck 102, with the breathable sheet 103 disposed between the roofing material 104 and the roof deck. The breathable sheet 103 is configured to prevent any liquid water that may come into contact with the sheet material from passing through the breathable sheet 103. The breathable sheet 103 is also breathable, so that any water that is trapped between the roof deck 102 and the sheet material can become water vapor (e.g. on a hot summer day) and pass through the sheet material.

Any of the breathable sheets as described above may be used as a roofing underlayment. In certain embodiments, a breathable sheet with an exposed nonwoven layer, (e.g. 10b or 10c) 3 may be used as a roofing underlayment in a roofing system. In these or other embodiments, the breathable sheet 103 may be laid on the roofing deck so that the first breathable polymer layer (e.g 12b or 12c) is against the roofing deck and the exposed nonwoven layer (e.g. 24b or 24c) is facing away from the roofing deck. Advantageously, the exposed nonwoven layer may provide increased traction for walking during roofing installation. In these or other embodiments, the breathable polymer layer has a high coefficient of friction with a roofing deck that helps the breathable sheet 103 grip the roofing deck.

Figure 9:
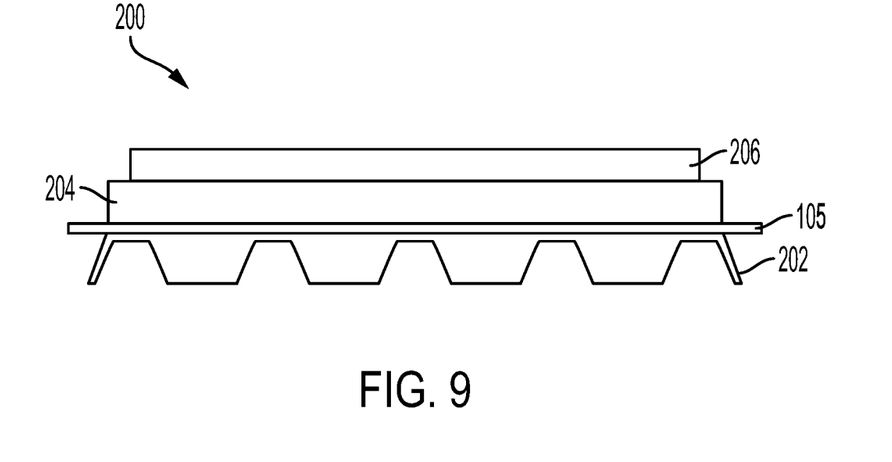
FIG. 9 is a side elevational view of an exemplary embodiment of a roofing system.

FIG. 9 illustrates a roof 200 that uses a breathable sheet 105 (e.g. the sheet 10a, 10b, 10c, or 10d) as a vapor control layer. The roof 200 includes a metal support structure 202. The breathable sheet 105 is disposed on the metal support structure 202. A layer of insulation 204 is disposed on the breathable sheet 105. A standing seam roofing panel 206, which may be made of metal, is situated above the layer of insulation 204. The standing seam roofing panel 206 may optionally be held in place by metal clips (not shown). Any of the breathable sheets as described above may be used as a vapor control layer in roof 200. In certain embodiments, the sheet material 10c as described in FIG. 4 may be used as a vapor control layer. In these or other embodiments, the sheet material 10d may be installed with the first nonwoven layer 22d facing the metal support structure 202 and the first breathable polymer layer 12d facing the layer of insulation 204.

The scope of the general inventive concepts are not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts, as described and claimed herein, and any equivalents thereof.

The invention claimed is:

1. A breathable sheet comprising:
 a first breathable polymer layer formed from a first breathable polymer composition; and
 a first nonwoven layer comprising polymeric fibers disposed on a top surface of the first breathable polymer layer;
 wherein the polymeric fibers of the first nonwoven layer have a diameter of from 10 microns to 50 microns,
 wherein the first breathable polymer layer has an area weight of 10 g/m$^2$ to 50 g/m$^2$ and wherein the first breathable polymer layer forms an outer surface of the breathable sheet,
 wherein the breathable sheet has an area weight of greater than 80 g/m$^2$ to less than 200 g/m$^2$ and a moisture vapor transmission rate of greater than 8 perms to less than 60 perms, and
 wherein the first breathable polymer composition comprises a blend of:
  (i) greater than 40 wt. % of an olefin-acrylate copolymer, based on a total weight of the first breathable polymer composition, the olefin-acrylate copolymer including from 10 wt. % to 40 wt. % acrylate mer units, based on the weight of the olefin-acrylate copolymer; and
  (ii) from 0.1 wt. % to 5 wt. % of an ethylene-acrylic ester-maleic anhydride terpolymer, based on the total weight of the first breathable polymer composition.

2. The breathable sheet of claim 1, further comprising a second breathable polymer layer disposed on a top surface of the first nonwoven layer.

3. The breathable sheet of claim 1, further comprising an open-mesh reinforcing fabric embedded in the first breathable polymer layer.

4. The breathable sheet of claim 3, where the open-mesh reinforcing fabric is a cross-laid glass scrim.

5. The breathable sheet of claim 1, where the first nonwoven layer is point bonded.

6. The breathable sheet of claim 1, where the first nonwoven layer is selected from the group consisting of meltblown nonwovens, spunbond nonwovens, flashspun nonwovens, and combinations thereof.

7. The breathable sheet of claim 1, wherein the first breathable polymer layer is a microporous polymer layer.

8. The breathable sheet of claim 1, wherein the the olefin-acrylate copolymer is an ethylene methyl acrylate copolymer.

9. The breathable sheet of claim 1, wherein the first breathable polymer composition further includes one or more of ethylene methacrylate copolymer and polyether block amide.

10. A roofing system comprising:
 a roofing deck;
 the breathable sheet of claim 1 disposed on a surface of the roofing deck such that the first breathable polymer layer contacts the surface of the roofing deck; and
 a roofing material disposed on a surface of the breathable sheet.

11. A breathable sheet comprising:
 a first breathable polymer layer formed from a breathable polymer composition;
 a first nonwoven layer comprising polymeric fibers applied to the first breathable polymer layer;
 wherein the polymeric fibers of the first nonwoven layer have a diameter of from 10 microns to 50 microns,
 wherein the first breathable polymer layer has an area weight of 10 g/m$^2$ to 50 g/m$^2$ and wherein the first breathable polymer layer forms an outer surface of the breathable sheet, wherein the breathable sheet has an area weight of greater than 80 g/m² to less than 260 g/m² and a moisture vapor transmission rate of greater than 8 perms to less than 60 perms, wherein the breathable polymer composition comprises a blend of:

(i) from 45 wt. % to 70 wt. % of an olefin-acrylate copolymer based on a total weight of the breathable polymer composition, the olefin-acrylate copolymer including from 10 wt. % to 40 wt. % acrylate mer units, based on the weight of the olefin-acrylate copolymer; and (ii) a random copolymer of ethylene and methyl acrylate; and wherein the breathable polymer composition has a total polymer content of greater than 90 wt. % based on a total weight of the breathable polymer composition.

12. The breathable sheet of claim 11, wherein the open-mesh reinforcing fabric comprises glass strands.

13. A wall system comprising:
a plurality of structural supports;
an exterior wall covering material; and
the breathable sheet of claim 11, wherein the breathable sheet is situated between the plurality of structural supports and the exterior wall covering material, and the breathable sheet is attached to the structural supports.

14. The wall system of claim 13, further comprising sheathing panels attached to the plurality of structural supports.

15. A roofing system comprising:
a metal support structure;
a breathable sheet disposed on the metal support structure, the breathable sheet comprising:

a first breathable polymer layer formed from a breathable polymer composition, and a first nonwoven layer comprising polymeric fibers applied to the first breathable polymer layer, wherein the polymeric fibers of the first nonwoven layer have a diameter of from 10 microns to 50 microns, wherein the first breathable polymer layer has an area weight of 10 g/m² to 50 g/m², wherein the breathable polymer composition comprises a blend of:

(i) at least 40 wt. % of an olefin-acrylate copolymer based on a total weight of the breathable polymer composition, based on a total weight of the first breathable polymer composition, the olefin-acrylate copolymer including from 10 wt. % to 40 wt. % acrylate mer units, based on the weight of the olefin-acrylate copolymer; and (ii) at least one of an ethylene-acrylic ester-maleic anhydride terpolymer and a random copolymer of ethylene and methyl acrylate; and wherein the first breathable polymer composition has a total polymer content of greater than 90 wt. % based on a total weight of the breathable polymer composition and wherein the breathable sheet has an area weight of greater than 80 g/m² to less than 200 g/m² and a moisture vapor transmission rate of greater than 8 perms to less than 60 perms;

a layer of insulation disposed on the breathable sheet; and
a standing seam roofing panel situated above the layer of insulation.

* * * * *